US011462764B2

(12) United States Patent
Casey et al.

(10) Patent No.: US 11,462,764 B2
(45) Date of Patent: Oct. 4, 2022

(54) DOUBLE-STACK REDOX FLOW BATTERY

(71) Applicant: ESS Tech, Inc., Wilsonville, OR (US)

(72) Inventors: Sean Casey, Portland, OR (US); Craig Evans, West Linn, OR (US)

(73) Assignee: ESS Tech, Inc., Wilsonville, OR (US)

( * ) Notice: Subject to any disclaimer, the term of this patent is extended or adjusted under 35 U.S.C. 154(b) by 24 days.

(21) Appl. No.: 17/209,084

(22) Filed: Mar. 22, 2021

(65) Prior Publication Data
US 2021/0359331 A1     Nov. 18, 2021

Related U.S. Application Data

(60) Provisional application No. 63/025,222, filed on May 15, 2020.

(51) Int. Cl.
*H01M 8/18*     (2006.01)
*H01M 8/248*     (2016.01)

(52) U.S. Cl.
CPC ........... *H01M 8/248* (2013.01); *H01M 8/188* (2013.01)

(58) Field of Classification Search
CPC ..................................................... H01M 8/188
See application file for complete search history.

(56) References Cited

U.S. PATENT DOCUMENTS

| 2013/0059185 A1 | 3/2013 | Whiteacre et al. |
| 2014/0004437 A1 | 1/2014 | Slocum et al. |
| 2018/0233834 A1 | 8/2018 | Evans et al. |
| 2018/0375128 A1* | 12/2018 | Kreiner ............... H01M 8/0289 |

FOREIGN PATENT DOCUMENTS

| CN | 102306821 B | 7/2014 |
| JP | 2014139905 A | 7/2014 |
| WO | 2019005558 A1 | 1/2019 |

OTHER PUBLICATIONS

ISA Korean Intellectual Property Office, International Search Report and Written Opinion Issued in Application No. PCT/US2021/032317, dated Aug. 27, 2021, WIPO, 12 pages.

* cited by examiner

*Primary Examiner* — Brian R Ohara
(74) *Attorney, Agent, or Firm* — McCoy Russell LLP

(57) ABSTRACT

Methods and systems are provided for a redox flow battery system. In one example, the redox flow battery system has a set of pressure plates with a sub-stack separator plate arranged between the first pressure plate and the second pressure plate and a first cell stack positioned between the first pressure plate and the sub-stack separator plate. The redox flow battery system may further include a second cell stack positioned between the second pressure plate and the sub-stack separator plate.

20 Claims, 9 Drawing Sheets

DOUBLE-STACK REDOX FLOW BATTERY

CROSS-REFERENCE TO RELATED APPLICATIONS

The present application claims priority to U.S. Provisional Application No. 63/025,222, entitled "DOUBLE-STACK REDOX FLOW BATTERY", and filed on May 15, 2020. The entire contents of the above-listed application are hereby incorporated by reference for all purposes.

FIELD

The present description relates generally to methods and systems for a redox flow battery.

BACKGROUND AND SUMMARY

Redox flow batteries may be suitable for grid scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low cost, earth-abundant materials. The iron redox flow battery (IFB) relies on iron, salt, and water for electrolyte, thus comprising simple, earth abundant, and inexpensive materials and eliminates incorporation of harsh chemicals thereby reducing an environmental footprint of the IFB.

However, the inventors herein have recognized when more than one IFB is needed to meet an energy demand, a multi-IFB system may become increasingly costly due to a multiplicity of a set of components, where inclusion of the set of components is demanded in each IFB. For example, each IFB may include two pressure plates per IFB which may cause a weight of the multi-IFB system to become burdensome as a number of the IFBs increases. Furthermore, costly manufacturing of hardware specific to a configuration of the IFBs may further escalate overall costs and weight.

In one example, the issues described above may be addressed by a redox flow battery system including a set of pressure plates. The set of pressure plates includes a first pressure plate at a first terminal end of the redox flow battery system and a second pressure plate at a second terminal end of the redox flow battery system, the second terminal end opposite of the first terminal end along a longitudinal axis of the redox flow battery system. The redox flow battery system further includes a sub-stack separator plate arranged between the first pressure plate and the second pressure plate and aligned with the set of pressure plates along the longitudinal axis, a first cell stack positioned between the first pressure plate and the sub-stack separator plate, and a second cell stack positioned between the second pressure plate and the sub-stack separator plate. In this way, an iron redox flow battery (IFB) system may be maintained compact and efficient without increasing costs and weight.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-9 are shown approximately to scale, however, other dimensions may be used as desired.

DETAILED DESCRIPTION

Figure 4:
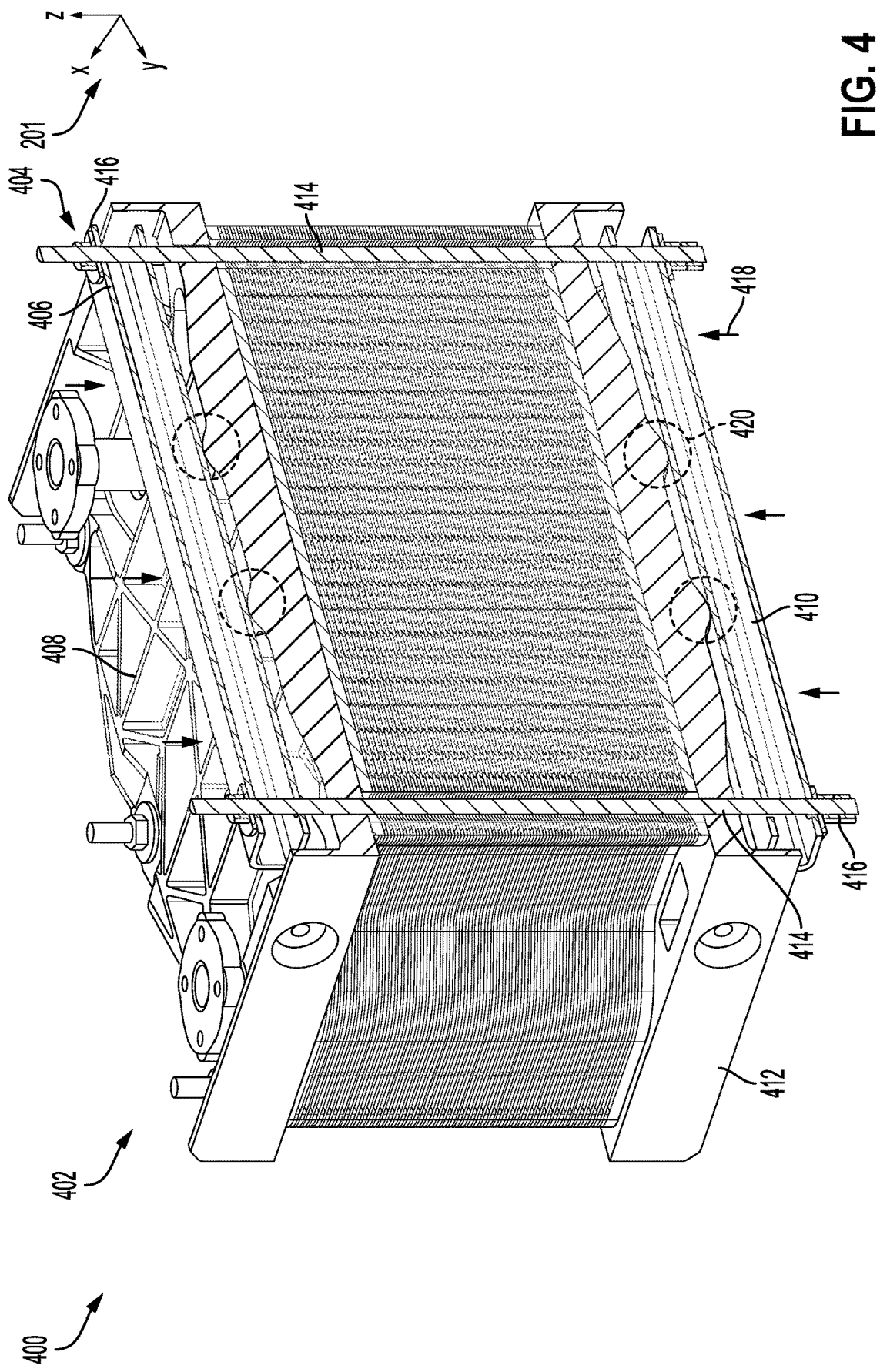
FIG. 4 shows a cut-away view of a redox flow battery adapted with a compression assembly.
Figure 5:
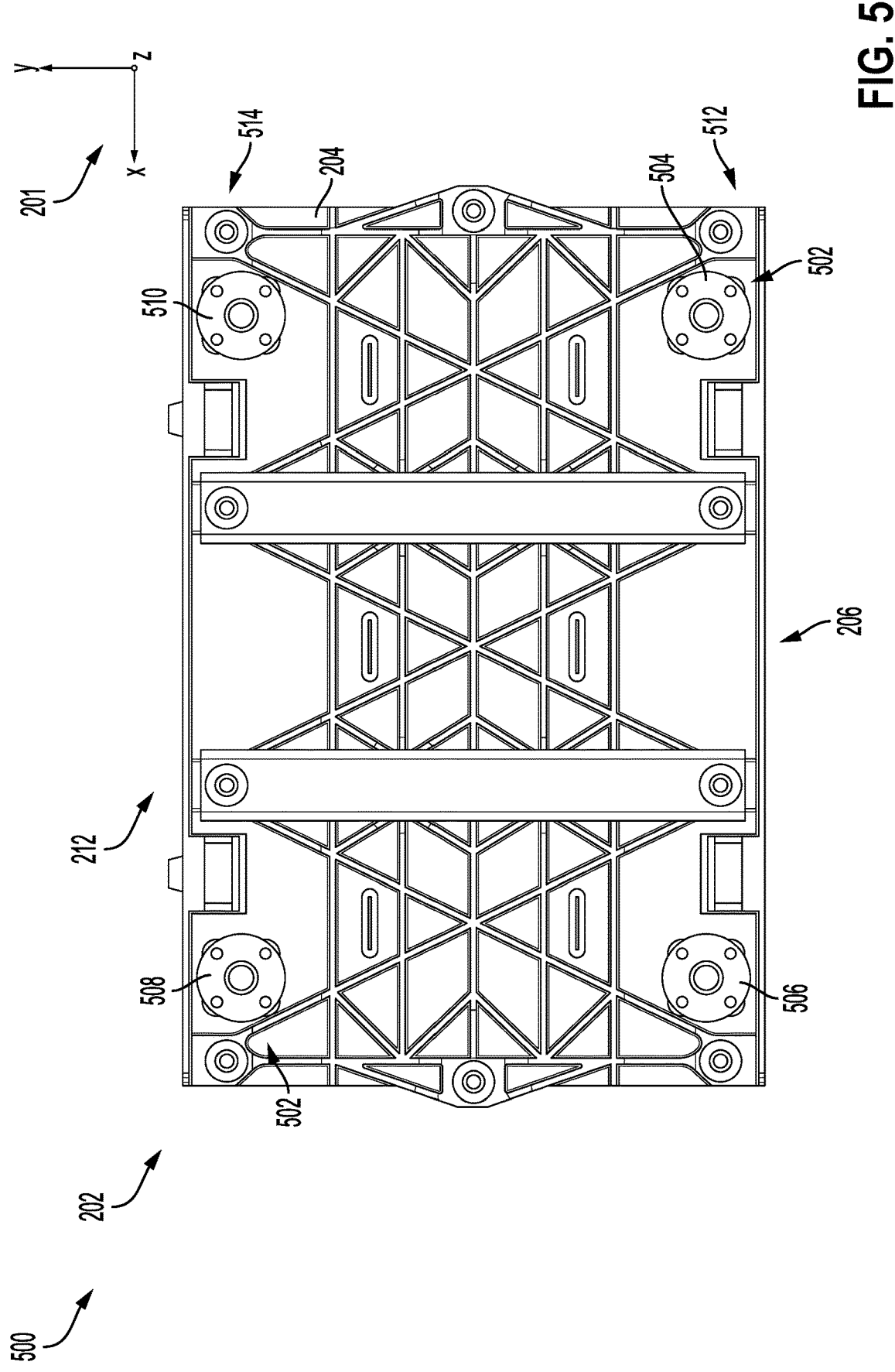
FIG. 5 shows a front view of the double-stack redox flow battery system.
Figure 6:
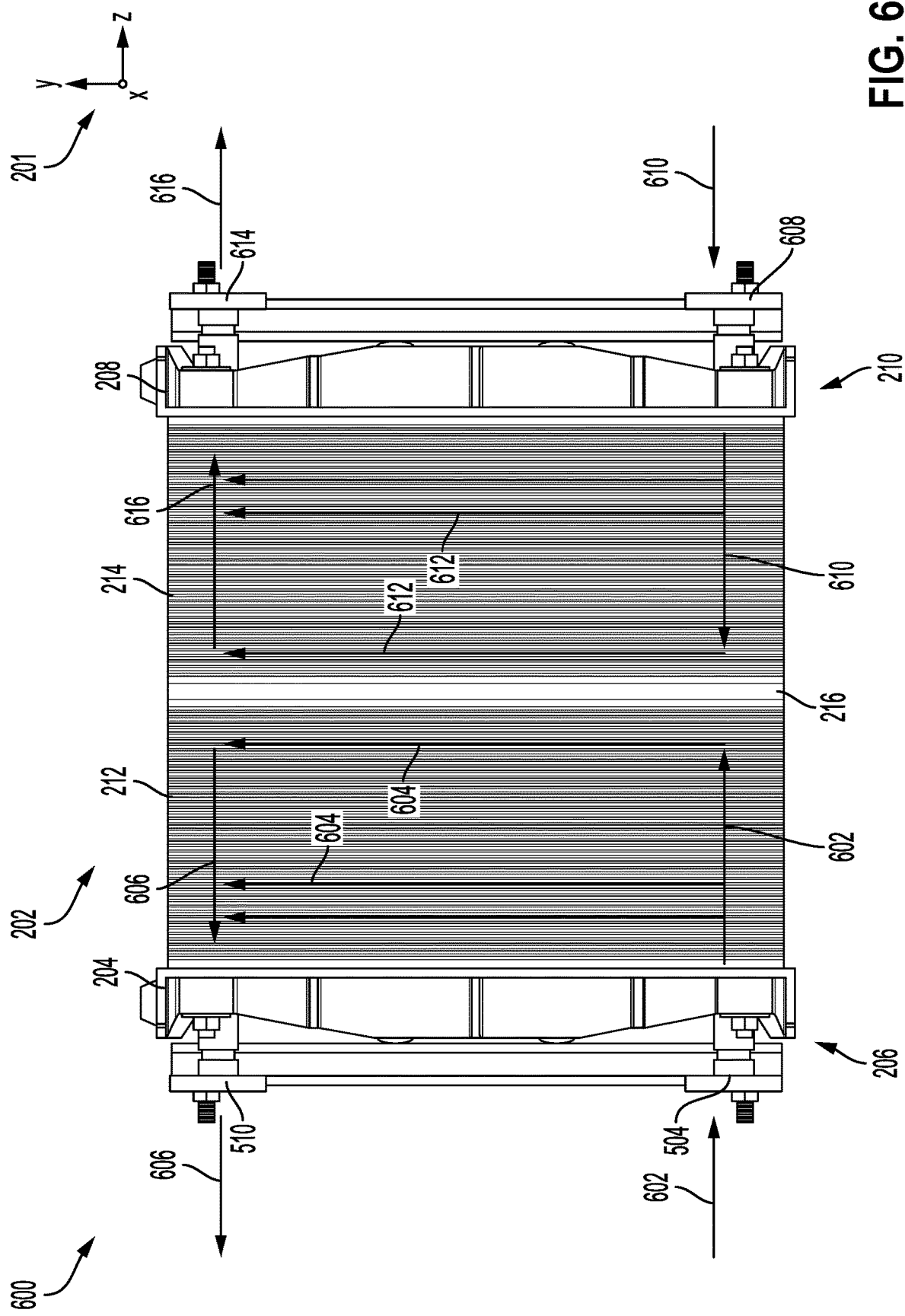
FIG. 6 shows a first side view of the double-stack redox flow battery system, indicating electrolyte flow paths.
Figure 7:
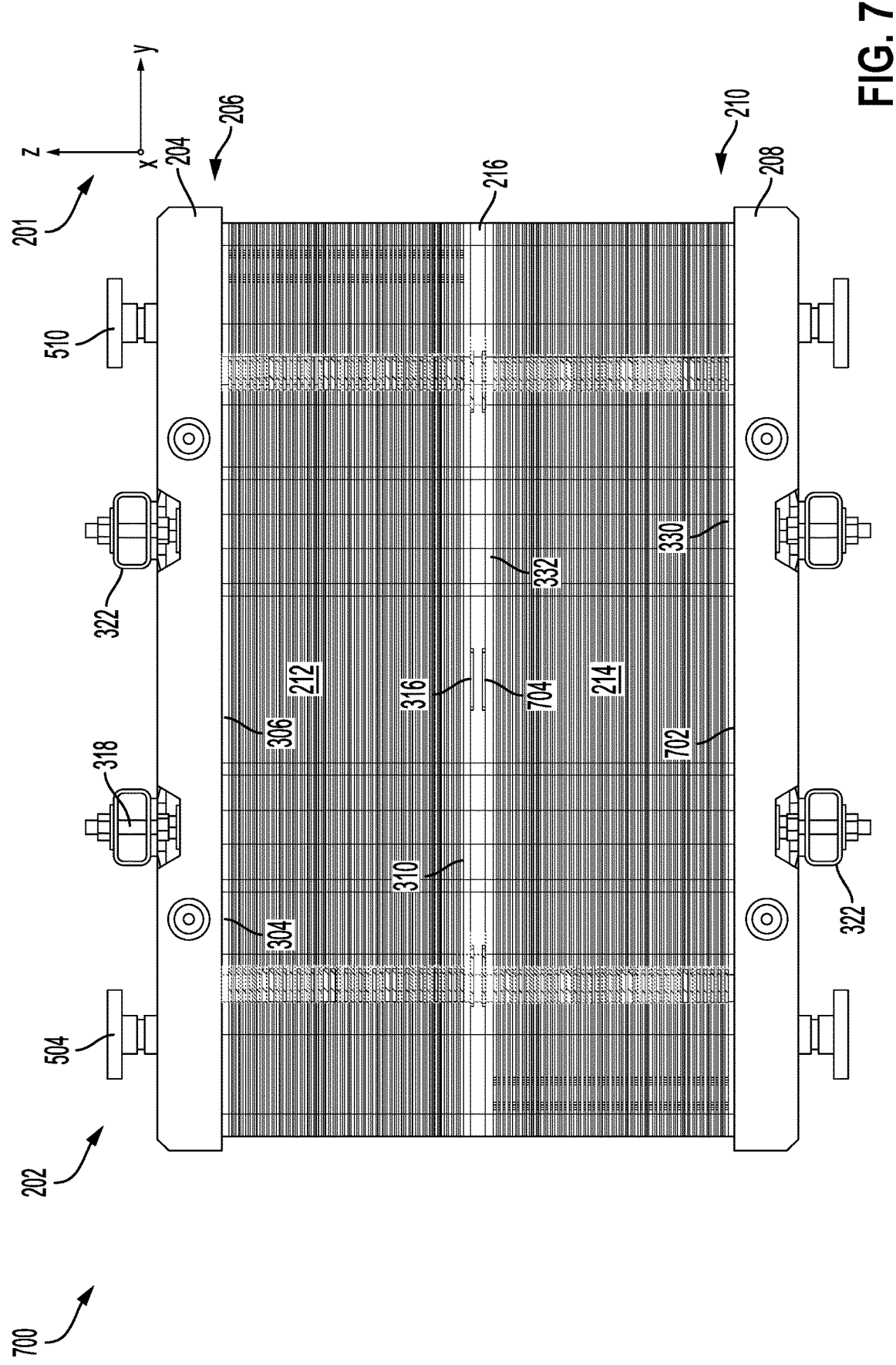
FIG. 7 shows a second side view of the double-stack redox flow battery system, indicating a location of current collectors.
Figure 8:
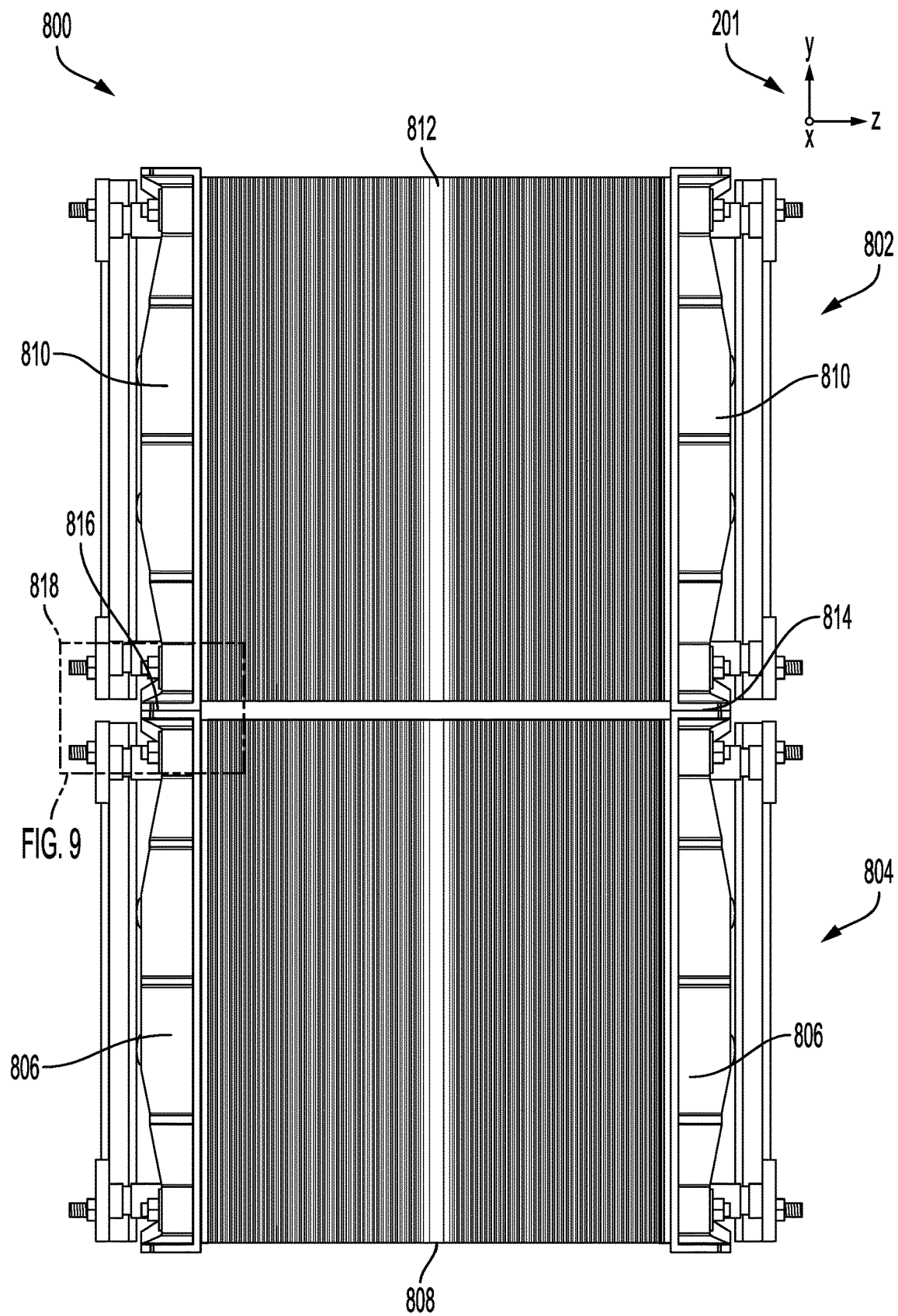
FIG. 8 shows a stacking configuration of more than one double-stack redox flow battery.
Figure 9:
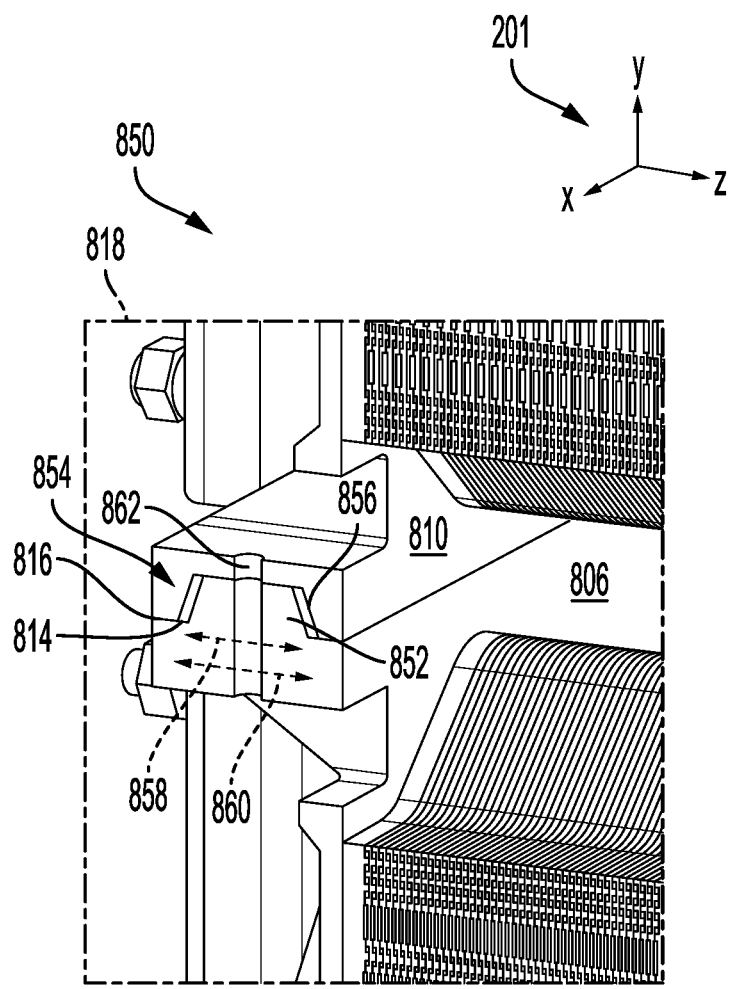
FIG. 9 shows a detailed view of a section of FIG. 8.

The following description relates to systems and methods for manufacturing a redox flow battery with reduced cost of storage. The redox flow battery is shown in a schematic diagram in FIG. 1 with an integrated multi-chamber tank having separate positive and negative electrolyte chambers. In some examples, the redox flow battery may be an all-iron flow battery (IFB) utilizing iron redox chemistry at both a negative and a positive electrode of the IFB. The electrolyte chambers may be coupled to one or more battery cells, each cell including the negative electrode and the positive electrode. To reduce a cost and weight of the IFB system when more than one IFB is incorporated, the IFB may be configured with more than one cell stack, as illustrated in FIG. 2 in a first embodiment of the IFB. The first embodiment of the IFB is depicted in an exploded view in FIG. 3. The one or more battery cells may be stacked along a common axis to form a cell stack which may be sandwiched between pressure plates and compressed by compression assemblies, as shown in FIG. 4 in a cut-away view of a second, embodiment of the IFB. The first embodiment of the IFB may be a double-stack IFB having a sub-stack separator plate dividing a first cell stack from a second cell stack. Electrolyte may flow in and out of the double-stack IFB via a plurality of inlets and outlets in at least one of the pressure plates as shown in a front view of the double-stack IFB in FIG. 5. Electrolyte flow paths through each cell stack of the double-stack IFB is depicted in FIG. 6 in a side view of the IFB and positioning of current collectors in the double-stack IFB is shown in FIG. 7. The double-stack IFB may be configured to be stackable, as shown in FIGS. 8 and 9, thereby further reducing a footprint of an overall IFB system.

FIGS. 2-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Hybrid redox flow batteries are redox flow batteries that are characterized by the deposition of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., a maximum amount of energy stored) of the redox battery may be limited by the amount of metal plated during battery charge and may depend accordingly on the efficiency of the plating system as well as the available volume and surface area available for plating.

Figure 1:
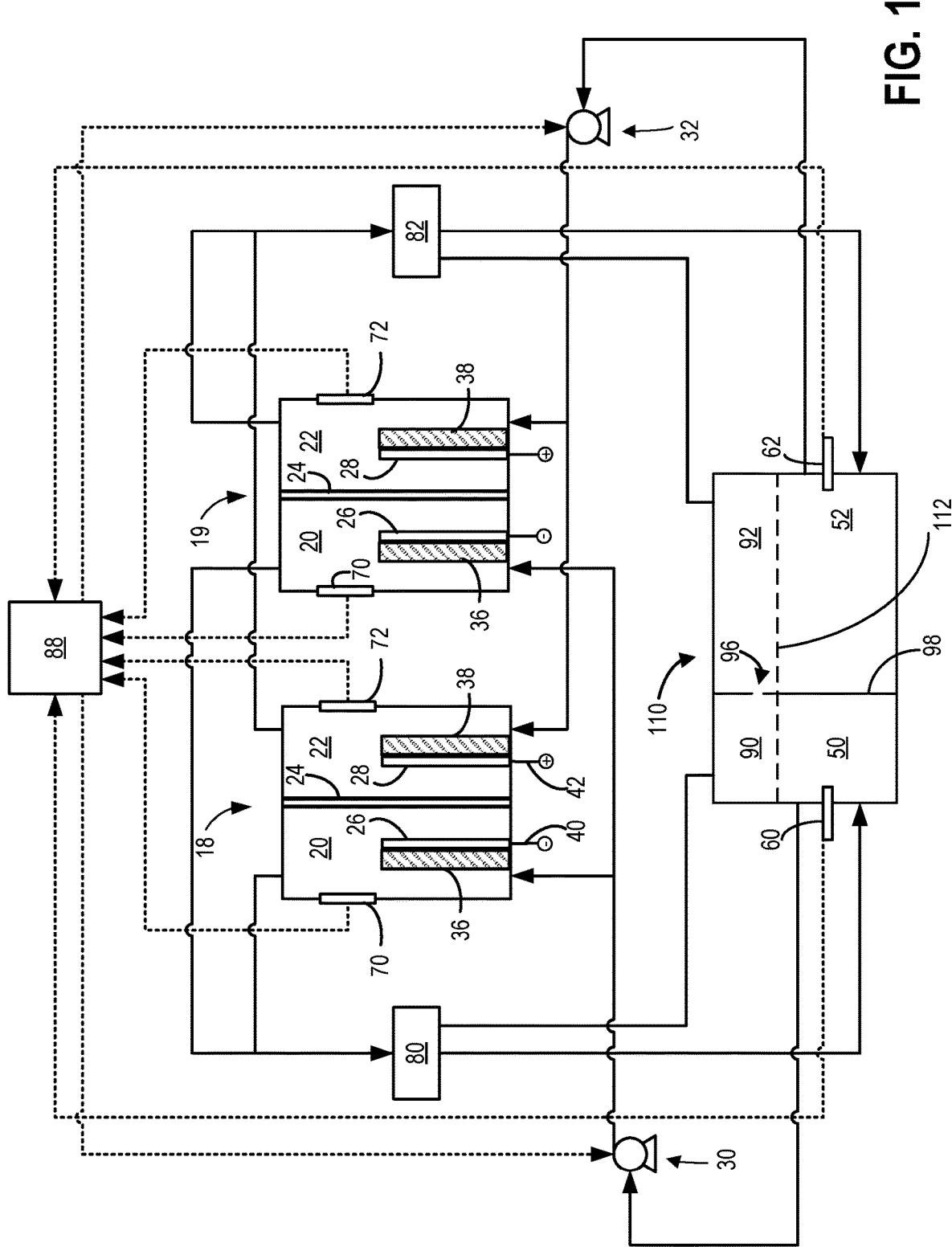
FIG. 1 shows a schematic of an example redox flow battery system including a battery cell with electrodes and a membrane separator.
Figure 2:
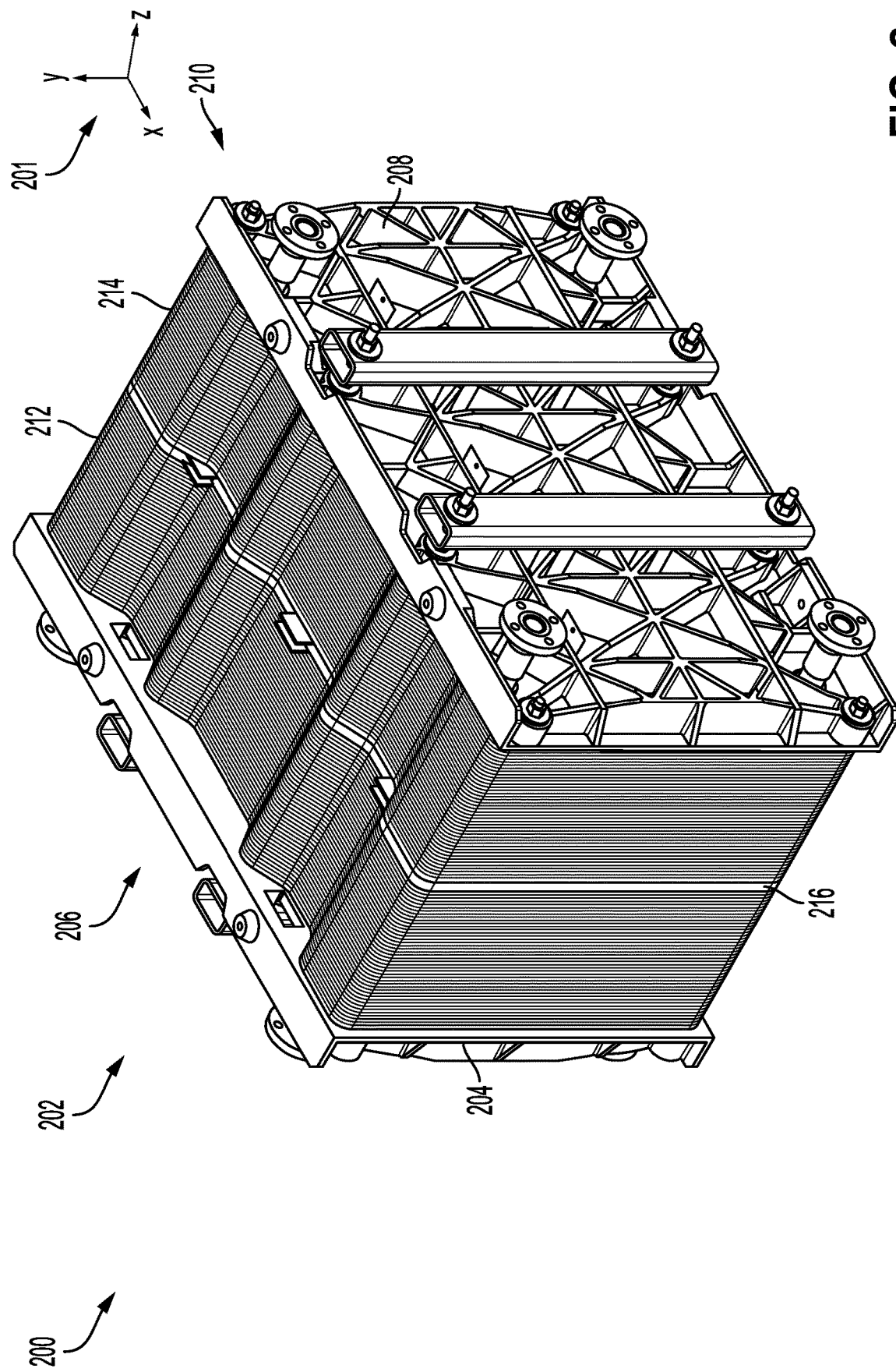
FIG. 2 shows a perspective view of a double-stack redox flow battery system.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a first battery cell 18 may be referred to as a plating electrolyte, and a positive electrolyte on a redox side (e.g. a positive electrode compartment 22) of the first battery cell 18 may be referred to as a redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Alternatively, during discharge, the negative electrolyte and negative electrode may be respectively referred to as an anolyte and anode of the electrochemical reaction, while the positive electrolyte and the positive electrode may be respectively referred to as a catholyte and cathode of the electrochemical reaction. During charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte includes iron ions in the form of iron salts (e.g., $FeCl_2$, $FeCl_3$, and the like), wherein the negative electrode includes metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e- \leftrightarrow Fe^0 -0.44 \text{ V (Negative Electrode)} \quad (1)$$

$$Fe^{2+} \leftrightarrow 2Fe^{3+}+2e- +0.77 \text{ V (Positive Electrode)} \quad (2)$$

As discussed above, the negative electrolyte used in the IFB may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and may be dissolved back into the electrolyte. The equilibrium potential of the above reaction is −0.44 V and thus, this reaction provides a negative terminal for the desired system. On the positive side of the IFB, the electrolyte may provide $Fe^{2+}$ during charge which loses an electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77 V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of the first battery cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of the first battery cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits ferric ion cross-over may also mitigate fouling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

Continuing with FIG. 1, a schematic illustration of the redox flow battery system 10 is shown. The redox flow battery system 10 may include the first redox flow battery cell 18 fluidly connected to a multi-chambered electrolyte storage tank 110. The first redox flow battery may generally include the negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane.

The negative electrode compartment 20 may include the negative electrode 26, and the negative electrolyte may be at least partially formed of electroactive materials. The positive electrode compartment 22 may comprise the positive electrode 28, and the positive electrolyte may comprise electroactive materials. In some examples, multiple redox flow battery cells 18 may be combined in series or in parallel to generate a higher voltage or current in a redox flow battery system. For example, in some examples, the redox flow battery system 10 may include two cell stacks, as shown in FIGS. 2-9, where each cell stack is formed of multiple battery cells. As an example, the redox flow battery system 10 is depicted in FIG. 1 with the first battery cell 18 as well as a second battery cell 19, similarly configured to the first battery cell 18. As such, all components and processes described herein for the first battery cell 18 may be similarly found in the second battery cell 19.

The first battery cell 18 may be included in a first cell stack and the second battery cell 19 may be included in a second cell stack. The first and second cells may or may not be either fluidly coupled to one another but are each fluidly coupled to the electrolyte storage tank 110 and rebalancing reactors 80, 82. For example, each of the first and second battery cells 18, 19 may be connected to negative and positive electrolyte pumps 30 and 32 via common passages that branch to each of the first and second battery cells 18 and 19, as shown in FIG. 1. Similarly, the battery cells may each have passages that merge into common passages coupling the battery cells to the rebalancing reactors 80, 82.

Further illustrated in FIG. 1 are the negative and positive electrolyte pumps 30 and 32, both used to pump electrolyte solution through the flow battery system 10. Electrolytes are stored in one or more tanks external to the cell, and are pumped via the negative and positive electrolyte pumps 30 and 32 through the negative electrode compartment 20 side and the positive electrode compartment 22 side of the battery, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates may be arranged proximate but spaced away from the electrodes within the respective electrode compartments. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may also be assisted by the negative and positive electrolyte pumps 30 and 32, facilitating forced convection through the first redox flow battery cell 18. Reacted electrochemical species may also be directed away from the reaction sites by the combination of forced convection and the presence of the first and second bipolar plates 36 and 38.

As illustrated in FIG. 1, the first redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and may induce a current through a current collector while the reactions are sustained. The amount of energy stored by a redox battery is limited by the amount of electro-active material available in electrolytes for discharge, depending on the total volume of electrolytes and the solubility of the electro-active materials.

The flow battery system 10 may further include the integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the first redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. As such, the stored hydrogen gas can aid in purging other gases from the multi-chamber storage tank 110, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank 110 can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber 52 includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples, the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solids fill threshold level. Said in another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers 50, 52 from a field hydration system (not shown). In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system 10 is to be installed and utilized for on-site energy storage. Said in another way, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated and commissioned. Prior to hydration the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the first battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence a packed catalyst bed.

During operation of the redox flow battery system 10, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72, 70 may be pH probes, optical probes, pressure sensors, voltage sensors, etc. Sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to a controller 88 which may in turn actuate pumps 30 and 32 to control electrolyte flow through the first battery cell 18, or to perform other control functions, as an example. In this manner, the controller 88 may be responsive to, one or a combination of sensors and probes.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example, the time period may be reduced if the recirculation rate is high, and local changes in concentration (e.g., due to side reactions or gas leaks) may quickly be measured since the time constants may be small.

As described above, an IFB system, e.g., the flow battery system 10 of FIG. 1, may include a plurality of battery cells, such as the first battery cell 18 and the second battery cell 19 of FIG. 1, stacked along a common axis and forming one or more cell stacks. An IFB of the IFB system may further include a variety of hardware providing structural support to the IFB and enabling an assembly of the hardware and the cell stack into a transportable unit. In some examples, multiple IFBs may be used to accommodate an energy demand, the multiple IFBs combined in a stack and linked to a common energy consuming device. However, as a number of IFBs in the IFB system increases, a weight and cost incurred by components, such as two pressure plates and four tube leaf springs per IFB, may become undesirably high. The cost and weight burden may be at least partially addressed by combining two IFBs into a single, double-stack IFB, the double-stack IFB incorporating a reduced number of hardware components relative to two individual, single-stack IFBs.

Figure 3:
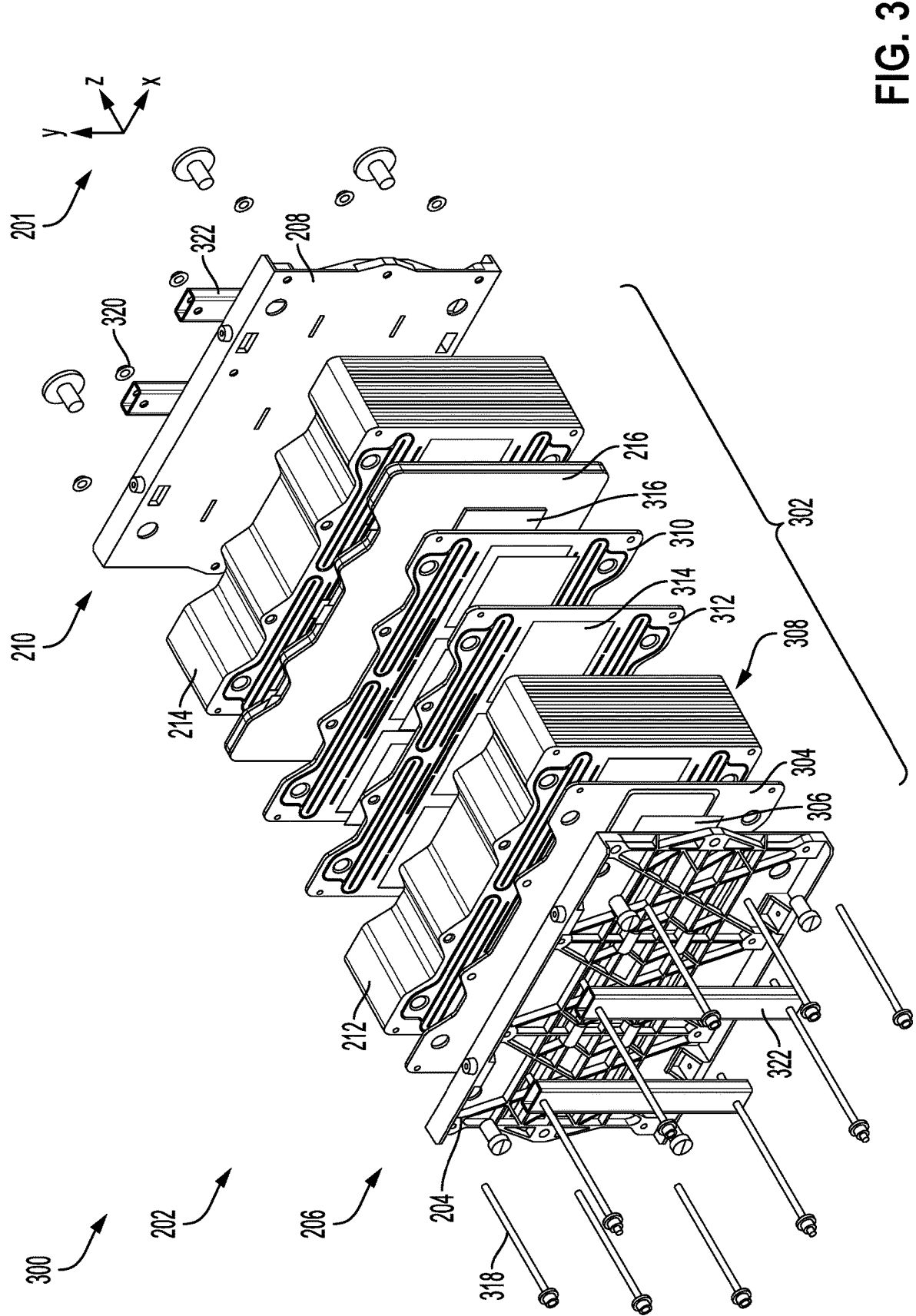
FIG. 3 shows an exploded view of the double-stack redox flow battery system of FIG. 2.

An example of a double-stack IFB 202 is illustrated in FIG. 2 from a perspective view 200 and from an exploded view 300 in FIG. 3. A set of references axes 201 are provided for comparison between views. In one example, the z-axis is parallel with a longitudinal axis of the IFB 202. The IFB 202 has a first pressure plate 204 at a first end 206 of the IFB 202 and a second pressure plate 208 at a second end 210 of the IFB 202.

A first cell stack 212 and a second cell stack 214 may be disposed between the first and second pressure plates 204, 208. Each cell of the first cell stack 212 and each cell of the second cell stack 214 may be similar to the first and second battery cells 18 and 19 of FIG. 1. In one example, the first cell stack 212 may be formed of 50 cells and the second cell stack 214 may also be formed of 50 cells. However, other examples may include cell stacks with varying quantities of cells and the cell stacks may or may not have the same number of cells. In yet other examples, the cell stacks may have more or less than 50 cells. Furthermore, other examples of an IFB may include different numbers of cells stacks incorporated into the IFB. For example, the IFB may have one cell stack or three cell stacks.

The first cell stack 212 may have a plurality of cells aligned along the z-axis and the second cell stack 214 may similarly include a plurality of cells aligned along the z-axis. The first cell stack 212 is also aligned with the second cell stack 214 along the z-axis and the cell stacks may be separated by a sub-stack separator plate 216 that provides electrical isolation between the cell stacks. In other words, the first cell stack 212 may be sandwiched between the first pressure plate 204 and a first face of the sub-stack separator plate 216 and the second cell stack 214 may be sandwiched between a second face of the sub-stack separator plate 216 and the second pressure plate 208. Details of the sub-stack separator plate 216 will be discussed further below.

Turning now to FIG. 3, elements of the double-stack IFB 202 are now described along a direction from the first end 206 towards the second end 210. Reference to an interior 302 of the IFB 202 indicates a region between the first pressure plate 204 and the second pressure plate 208. The first cell stack 212 includes a first end plate 304 positioned inside of the first pressure plate 204 and in face-sharing contact with an interior surface of the first pressure plate 204. In other words, a surface of the first pressure plate 204 facing the interior 302 of the IFB 202 is in contact with a surface of the first end plate 304 facing away from the interior 302 of the IFB 202. A first current collector 306, configured to flow electrical current, may be arranged between the first end plate 304 and the first pressure plate 204.

A first bipolar plate assembly 308 is arranged between the first end plate 304 and a second end plate 310 of the first cell stack 212. The bipolar plate assembly 308 includes a plurality of frame plates 312 stacked along the z-axis, the plurality of frame plates 312 providing structural support to the first and second cell stacks 212, 214. Each frame plate of the plurality of frame plates 312 is similarly configured to frame a cell of the first cell stack 212 and the second cell stack 214. Each cell includes at least one bipolar plate 314 inserted into at least one opening of each frame plate. Furthermore, the bipolar plate 314 is positioned between a negative electrode and a positive electrode (not shown in FIG. 3) of each cell, the electrodes arranged along opposite faces of the bipolar plate. In addition, the negative electrode is positioned between the bipolar plate 314 and a membrane separator (e.g., the separator 24 of FIG. 1). In this way, each frame plate has a stack of components including the membrane separator, the negative electrode, the bipolar plate 314, and the positive electrode, and the stack of components is repeated with each successive frame plate in the first and second cell stacks 212 and 214.

The second end plate 310 of the first cell stack 212 may be in face-sharing contact with a first surface of the sub-stack separator plate 216, the first surface facing the first end 206 of the IFB 202. In other words, a surface of the second endplate 310 facing the second end 210 of the IFB 202 is in contact with the first surface of the sub-stack separator plate 216. A second current collector 316 may be arranged between the second end plate 310 and the sub-stack separator plate 216.

The second cell stack 214 may similarly extend along the z-axis between end plates. For example, as depicted in FIG. 7, the second cell stack 214 may have a third end plate 330 at the second end 310 of the IFB 302 and a fourth end plate 332 adjacent to the sub-stack separator plate 216. The fourth end plate 332 may be arranged on an opposite side of the sub-stack separator plate 216 from the second end plate 310. As such, a surface of the fourth end plate 332 facing the first end 206 of the IFB 202 is in face-sharing contact with a second side of the sub-stack separator plate 216, the second side facing the second end 210 of the IFB 202.

The second cell stack 214 includes a second bipolar assembly similar to the first bipolar assembly 308. Furthermore, the second cell stack 214 may be equivalently configured to the first cell stack 212 when the first cell stack 212 is rotated about the y-axis by 180 degrees. A third current collector may be arranged between the sub-stack separator plate 216 and the end plate of second cell stack 214 proximate to the sub-stack separator plate 216. A surface of the end plate of the second cell stack 214 proximate to the second pressure plate 208 may be in face-sharing contact with a surface of the second pressure plate 208 that is facing the first end 206 of the IFB 202.

The end plates of the cell stacks may provide solid end walls to seal fluids, such as electrolyte, inside the cell stacks. The first and second cell stacks 212, 214 may be secured between and to the first and second pressure plates 204, 208, by a variety of hardware, including, for example, tie rods 318, nuts 320, and tube leaf springs 322. The tube leaf springs 322 may include rectangular tubes extending across outer surfaces of the first and second pressure plates 204, 208, along the y-axis. Details of the tube leaf springs 322 are described next with reference to FIG. 4.

Compression of an IFB by the hardware described above is depicted in a cut-away view 400 of an alternate embodiment of an IFB 402 in FIG. 4. The IFB 402 is cut along the y-z plane. While FIG. 4 shows the IFB 402 with a single stack for brevity, hardware enabling compression of the IFB 402 may be similarly applied to a double-stack IFB. As described above, the hardware includes compression assemblies 404 which provides compression mechanisms for the IFB 402. Each of the compression assemblies 404 is formed of a first leaf spring 406 extending along the x-axis across a first pressure plate 408, a second leaf spring 410 extending along the x-axis across a second pressure plate 412, and tie rods 414 extending along the z-axis and engaging with both the first leaf spring 406 and the second leaf spring 410.

For example, the tie rods 414 may be inserted through openings in each of the first and second leaf springs 406, 412 and tightening using nuts 416 which may engage with the tie rods 414 via threading. As the nuts 416 are tightened around the tie rods 414, a compressive force is exerted on the first and second pressure plates 408, 412 by the first and second leaf springs 406, 412, as indicated by arrows 418. Each of the first and second leaf springs 406, 412 have fulcrums, indicated by dashed circles 420, formed in the first and second pressure plates 408, 412, which spread a load exerted on the pressure plates by the leaf springs uniformly across the pressure plates. In this way, the compression assemblies 404 reduce deflection of the IFB cell stack(s) when the IFB 402 is compressed.

A configuration of a double-stack IFB, such as the double-stack IFB 202 shown in FIGS. 2-3, with each cell of each cell stack supported by a plurality of frame plates, the cell stacks braced by a first pressure plate and a second pressure plate, the pressure plates coupled to one another by fasteners and compressing the IFB via compression assemblies as described above, allows the double-stack IFB to be self-supporting. In other words, the double-stack IFB does not rely on an outer housing to maintain components of the IFB, which may otherwise add to a weight and cost of the double-stack IFB. The double-stack IFB is thereby a robust, readily transportable unit configured to be compressed with reduced deflection.

Operation of the double-stack IFB may vary depending on how electrolyte is adapted to flow through the double-stack IFB. An example configuration of electrolyte flow through the double-stack IFB is depicted in FIG. 5. A front view 500 of the double-stack IFB 202 of FIG. 2 is shown in FIG. 5, showing the first pressure plate 204. In another example, the view shown in FIG. 5 may be a rear view of the double-stack IFB 202 depicting the second pressure plate 208. In other words, the first pressure plate 204 and the second pressure plate 208 may be similarly configured and the following description of aspects of the first pressure plate 204 as well as electrolyte flow through the first cell stack 212 of the double-stack IFB 202 may be applied to the second pressure plate 208 and the second cell stack 214.

The first pressure plate 204, arranged at the first end 206 of the IFB 202, as shown in FIG. 2, may have a plurality of ports 502 extending through a thickness of the first pressure plate 204 where the thickness is defined along the z-axis. In one example, the first end 206 of the IFB 202 may be a positive end of the first cell stack 212 of the IFB 202. A first port 504 of the plurality of ports 502 may be a negative inlet, flowing negative electrolyte into the IFB 202. A second port 506 of the plurality of ports 502 may be a positive inlet, flowing positive electrolyte into the IFB 202. A third port 508 of the plurality of ports 502 may be a negative outlet port, flowing negative electrolyte out of the IFB 202, and a fourth port 510 of the plurality of ports 502 may be a positive outlet port, flowing positive electrolyte out of the IFB 202. As such, all electrolyte entering the first cell 212 of the IFB 202 may enter through the first pressure plate 204 and all electrolyte leaving the IFB 202 may also exit through the first pressure plate 204. In one example, electrolyte enters and exits the first cell 212 only through the first pressure plate 204.

Both the first port 504 and the second port 506 may be positioned at a bottom end 512, with respect to the y-axis, of the IFB 202, aligned along the x-axis. The third port 508 and the fourth port 510 may be positioned at a top end 514, with respect to the y-axis, of the IFB 202, also aligned along the x-axis. Thus, negative electrolyte follows a negative flow path into the first cell stack 212 of the IFB 202 at the first port 504 along a first direction from the first pressure plate 204 to the sub-stack separator plate 216, as shown in FIG. 6 in a first side view 600 of the IFB 202 and indicated by arrows 602. The negative flow path may turn to the left (with respect to the front view 500 shown in FIG. 5) and upwards (along the y-axis) as indicated by arrows 604 at more than one location along the z-axis between the first pressure plate 204 and the sub-stack separator plate 216. The flow path may make another perpendicular turn to flow along a second direction from the sub-stack separator plate 216 to the first pressure plate 204, as indicated by arrows 606, to emerge from the third port 508.

Similarly, positive electrolyte follows a positive flow path into the first cell stack 212 of the IFB 202 at the second port 506 along the first direction, indicated by arrows 602 in FIG. 6, the positive flow path turning to the right (with respect to the front view 500 shown in FIG. 5) and upwards (along the y-axis) at locations along the z-axis between the first pressure plate 204 and the sub-stack separator plate 216. The flow path turns again, perpendicularly, to flow along the second direction, as indicated by arrows 606 in FIG. 6, from the sub-stack separator plate 216 to the first pressure plate 204 to emerge from the fourth port 510.

Analogous electrolyte flow paths may be implemented in the second cell stack 214 of the IFB 202, as shown in FIG. 6. For example, positive or negative electrolyte may flow into a fifth port 608 disposed in the second pressure plate 208, as indicated by arrows 610, travel upwards at various locations between the second pressure plate 208 and the sub-stack separator plate 216, as indicated by arrows 612, and exit through a sixth port 614, as indicated by arrows 616. The second pressure plate 208 may also have a seventh port, aligned with the fifth port 608 along the x-axis, and an eighth port aligned with the sixth port 614 along the x-axis, also configured to flow negative or positive electrolyte through the second cell stack 214.

When flow of electrolyte between the first cell stack 212 and the second cell stack 214 is inhibited by the sub-stack separator plate 216, independent operation of the cell stacks may be enabled. For example, the first cell stack 212 may be activated by turning on a first electrolyte pump, configured to drive electrolyte flow through the first cell stack 212. Simultaneously, the second cell stack 214 may be deactivated by maintaining electrolyte stagnant within the second cell stack 214. The electrolyte in the second cell stack 214 may be stagnant when a second electrolyte pump, configured to drive electrolyte flow through the second cell stack 214, is turned off or maintained off. Similarly, the first cell stack 212 may be deactivated by turning the first electrolyte pump off while the second cell stack 214 is activated by turning the second electrolyte pump on. In this way, a variable amount of power may be derived from the double-stack IFB 202. The double-stack IFB 202 may be fully deactivated, fully activated with electrolyte flowing through both cell stacks, or configured to provide a lower amount of power by operating the double-stack IFB 202 with electrolyte flowing through one cell stack and not the other.

As another example, the double-stack IFB 202 may have ports in one pressure plate but not the other pressure plate. For example, the first pressure plate 204 may have the first port 504, the second port 506, the third port 508 and the fourth port 510 while the second pressure plate 208 has no ports. As such, the sub-stack separator plate 216 may be adapted with openings to allow electrolyte entering the first cell stack 212 of the double-stack IFB 202 to continue flowing through the sub-stack separator plate 216 and into the second cell stack 214. Electrolyte may circulate through the second cell stack 214, return to the first cell stack 212 through the openings in the sub-stack separator plate 216 and exit the first cell stack 212 through the first pressure plate 204. In such a configuration, the cell stacks may be activated separately, thus operation of the IFB 202 includes flowing electrolyte through both the first cell stack 212 and the second cell stack 214 simultaneously. While power supply may not be varied when the sub-stack separator plate 216 is adapted to fluidly couple the second cell stack 214 to the first cell stack 212, operating controls may be simplified compared to independent operation of the first cell stack 212 and the second cell stack 214.

It will be appreciated that the IFB 202 shown in FIGS. 2-3 and 5-7 is a non-limiting example and other examples may include variations in electrolyte flow paths without departing from the scope of the present disclosure. For example, the electrolyte flow paths may instead enter the IFB at an upper region of the IFB and exit the IFB at a lower region of the IFB, or the electrolyte flow paths may enter and exit at a mid-region between the upper and lower regions.

As electrolyte-facilitated reactions occur at positive and negative electrodes of a double-stack IFB, electrons may be channeled to current collectors via electrically conducting lines, such metallic wires, extending between each terminal of each electrode, e.g., terminals 40 and 42 of FIG. 1, and the current conductors. Each positive electrode of each cell in a cell stack may be electrically coupled to a positive current collector and each negative electrode of each cell in the cell stack may be electrically coupled to a negative current collector. The positive and negative current collectors may transport electrons to an external circuit to energize, for example, an electrically powered device, and do not themselves participate in redox chemistry in the IFB.

The current collectors may be formed of a conductive material, such as a metal or a resin, and dimensions, e.g., length, width, thickness, etc., of the current collectors may affect a current density transmitted to the electrically powered device. The positive current collector may be arranged at an opposite end of the cell stack from the negative current collector. For example, as shown in a second side view 700 of the double-stack IFB 202 in FIG. 7, the first current collector 306 of the first cell stack 312 (also shown in FIG. 3) may be a first positive current collector 306 located between the first pressure plate 204 and the first end plate 304. The second current collector 316 of the first cell stack 212 may be a first negative current collector 316 arranged between the second end plate 310 and the sub-stack separator plate 216.

The second cell stack 214 may have a third current collector 702 positioned between the second pressure plate 208 and the third end plate 330 of the double-stack IFB 202. The third current collector 702 may be a second positive current collector 702. A fourth current collector 704 may be a second negative current collector 704, arranged between the sub-stack separator plate 216 and the fourth end plate 332 of the second cell stack 214.

Each of the first cell stack 212 and the second cell stack 214 is thus configured to be individual electrical circuits, electrically insulated from one another by the sub-stack separator plate 216. Each of the current collectors may be readily coupled to an external circuit to direct current to an external device.

The sub-stack separator plate 216, as described above, may provide electrical isolation of the cell stacks in the double-stack IFB 202. Electrolyte may or may not be communicated between the cell stacks through the sub-stack separator plate 216, depending on a configuration of electrolyte flow channels in the IFB 202. For example, the sub-stack separator plate 216 may be a solid plate, blocking flow between the cell stacks, as shown in FIG. 6. Alternatively, the sub-stack separator plate 216 may include openings or ports to accommodate electrolyte flow channels between the cell stacks.

Implementing at least one double-stack IFB in an IFB system may enable variable power supply to one or more external devices, as described above. For example, operation of the double-stack IFB may be adjusted by a controller, such as the controller 88 of FIG. 1, to either increase or decrease an amount of power generated by the double-stack IFB based upon a detected demand for power. For example, when a power demand is low, the controller 88 may deactivate a first cell stack of the double-stack IFB while operating a second cell stack of the double-stack IFB. Power is thereby supplied by the second cell stack only. However, when an electrically coupled external device is determined to have a high energy draw, the controller may activate both the first and the second cell stack to increase an amount of power delivered by the double-stack IFB.

In some examples, more than one double-stack IFB may be implemented in an IFB system. In such systems, the more than one double-stack IFB may be configured to stack on top of one another in a secure manner to maintain a compact footprint of the IFB system. An example of an IFB system 800 with more than one double-stack IFB is shown in FIG. 8. The IFB system 800 includes a first double-stack IFB 802 and a second double-stack IFB 804, the second double-stack IFB 804 stacked on top of the first double-stack IFB 802.

Each of the first double-stack IFB 802 and the second double-stack IFB 804 may be similarly configured to the double stack IFB 202 of FIGS. 2-3 and 5-7. The first double-stack IFB 802 may be oriented so that a first set of pressure plates 806 and a first sub-stack separator plate 808 of the first double-stack IFB 802 are aligned with the y-axis. Similarly, the second double-stack IFB 804 may be oriented so that a second set of pressure plates 810 and a second sub-stack separator plate 812 of the second double-stack IFB 804 are also aligned with the y-axis. The second double-stack IFB 804 is arranged above the first double-stack IFB 802 along the y-axis so that upper edges 814 of the first set of pressure plates 806 are in contact with bottom edges 816 of the second set of pressure plates 810.

The sets of pressure plates may be adapted with nesting detents to align the stacked double-stack IFBs and maintain the alignment of the stacked double-stack IFBs. For example, as depicted in an expanded view 850 in FIG. 9 of dashed area 818, the upper edges 814 of the first set of pressure plates 806 may include a first, male half 852 of a nesting detent 854 that protrudes upwards, along the y-axis. The bottom edges 816 of the second set of pressure plates 810 may include a second, female half 856 of the nesting detent 854, the second half 856 of the nesting detent 854 protruding downwards along the y-axis.

A diameter 858 of the first half 852 of the nesting detent 854 may be slightly smaller than a diameter 860 of the second half 856 of the nesting detent 854 to allow the first half 852 to slide readily into the second half 856. Thus, when the second double-stack IFB 804 is stacked on top of the first double-stack IFB 802, the first half 852 of the nesting detent 854 is nested within the second half 856 of the nesting detent 854 and sideways sliding of the first and second double-stack IFBs 802, 804 relative to one another is inhibited. Engagement of the first half 852 with the second half 856 of the nesting detent 854 also aligns the double-stack IFBs along the y-axis.

In addition, the nesting detent 854 may have a through-hole 862 extending along the y-axis through both the first half 852 and the second half 856 of the nesting detent 854. The through-hole 862 may be a pin hole or a bolt hole that, when a pin or bolt is inserted through the through-hole 862, secures the first half 852 of the nesting detent 854 to the second half 856 of the nesting detent 854, thereby securing the first double-stack IFB 802 and the second double-stack IFB 804 to one another.

Incorporating more than one double-stack IFB in an IFB system may widen a range of power supplied by the IFB system. For example, in the IFB system 800 shown in FIG. 8, when a demand for power is low, a single cell stack of one of the double-stack IFBs may be operated while the other cell stacks are deactivated. As an example, a first cell stack of the first double-stack IFB 802 shown in FIG. 8 may be operated by actuating an electrolyte pump and circulating electrolyte through the first cell stack. A second cell stack of the first double-stack IFB 802 may be deactivated by turning off an electrolyte pump or maintaining the pump off so that electrolyte is stagnant within the second cell stack. Electrolyte pumps coupled to a first and a second cell stack of the second double-stack IFB 804 be similarly deactivated. Thus energy is provided exclusively by the first cell stack of the first double-stack IFB 802.

When power demand is high, all cell stacks of both double-stack IFBs may be operated to meet the energy demand. Alternatively, when power demand is moderate, one of the double-stack IFBs may be actively generating power while the other is turned off. As a result, wasteful operation of the IFB system, e.g., providing more power than requested, is mitigated and a lifetime of IFB components may be prolonged via efficient usage.

In this way, an energy storage capacity of an IFB system may be enhanced by increasing a number of IFBs in the IFB system without proportionally increasing a number of hardware components. A number of pressure plates and fastening assemblies, e.g., bolts, nuts, etc., may be reduced by at least half, thereby decreasing an overall cost of the IFB system. As an example, two individual cell stacks may be combined into a single double-stack IFB, held together by one set of pressure plates and one fastening assembly. Electrical isolation between the cell stacks may be maintained by arranging a sub-stack separator plate between the cell stacks.

The technical effect of configuring an IFB in an IFB system as a double-stack IFB is that an energy storage capacity of the IFB may be increased while reducing manufacturing costs.

In one example, a redox flow battery system comprises a set of pressure plates including a first pressure plate at a first terminal end of the redox flow battery system and a second pressure plate at a second terminal end of the redox flow battery system, the second terminal end opposite of the first terminal end along a longitudinal axis of the redox flow battery system, a sub-stack separator plate arranged between the first pressure plate and the second pressure plate and aligned with the set of pressure plates along the longitudinal axis, a first cell stack positioned between the first pressure plate and the sub-stack separator plate, and a second cell stack positioned between the second pressure plate and the sub-stack separator plate. A first example of the redox flow battery system further includes wherein the sub-stack separator plate electrically isolates the first cell stack from the second cell stack. A second example of the redox flow battery system, optionally including the first example of the redox flow battery system, further includes wherein the first cell stack and the second cell stack are compressed between the set of pressure plates by pressure exerted on the set of pressure plates by leaf springs. A third example of the redox flow battery system, optionally including one or more of the first and second examples of the redox flow battery system, further includes wherein the set of pressure plates, the first cell stack, the sub-stack separator plate, and the second cell stack are maintained in place by a plurality of bolts extending along the longitudinal axis. A fourth example of the redox flow battery system, optionally including one or more of the first through third examples of the redox flow battery system, further includes wherein the redox flow battery system is a self-supporting unit that does not include an external housing. A fifth example of the redox flow battery system, optionally including one or more of the first through fourth examples of the redox flow battery system, further includes wherein each of the first cell stack and the second cell stack is formed from a plurality of cells and wherein each cell of the plurality of cells includes a negative electrode, a positive electrode, a bipolar plate, and a membrane separator. A sixth example of the redox flow battery system, optionally including one or more of the first through fifth examples of the redox flow battery system, further includes wherein each cell of the plurality of cells in each of the first cell stack and the second cell stack is supported within a frame plate and each frame plate is aligned along the longitudinal axis and in contact with a frame plate adjacent to a face of the frame plate. A seventh example of the redox flow battery system, optionally including one or more of the first through sixth examples of the redox flow battery system, further includes wherein each cell of the plurality of cells of the first cell stack is fluidly coupled to other cells of the plurality of cells within the first cell stack and each cell of the plurality of cells of the second cell stack is fluidly coupled to other cells of the plurality of cells within the second cell stack. An eighth example of the redox flow battery system, optionally including one or more of the first through seventh examples of the redox flow battery system, further includes wherein a flow of an electrolyte between the first cell stack and the second cell stack is blocked by the sub-stack separator plate. A ninth example of the redox flow battery system, optionally including one or more of the first through eighth examples of the redox flow battery system, further includes wherein an electrolyte flows between the first cell stack and the second cell stack via openings in the sub-stack separator plate.

In another example, an all-iron flow battery comprises a plurality of cells compressed between a first pressure plate and a second pressure plate, the plurality of cells formed of a first cell stack and a second cell stack, and wherein the first cell stack is separated from the second cell stack by a sub-stack separator plate positioned at a mid-point along a longitudinal axis of the all-iron flow battery and wherein the compression is provided by one or more compression assemblies. A first example of the all-iron flow battery further comprises a set of inlet ports in the first pressure plate configured to flow electrolyte into the first cell stack, through the sub-stack separator plate, and into the second cell stack and a set of outlet ports in the first pressure plate configured to flow electrolyte out of the second cell stack, through the sub-stack separator plate, and out of the first cell stack and wherein the second pressure plate is a solid plate without ports. A second example of the all-iron flow battery, optionally including the first example of the all-iron flow battery, further comprises a first set of inlet ports and a first set of outlet ports in the first pressure plate configured to circulate electrolyte through the first cell stack, between the first pressure plate and the sub-stack separator plate and a second set of inlet ports and a second set of outlet ports in the second pressure plate configured to circulate electrolyte through the second cell stack, between the second pressure plate and the sub-stack separator plate. A third example of the all-iron flow battery, optionally including one or more of the first and second examples of the all-iron flow battery, further comprises a first negative current collector arranged between the sub-stack separator plate and the first cell stack and a first positive current collector arranged between the first pressure plate and the first cell stack, wherein the first negative current collector is electrically coupled to each negative electrode of each cell of the first cell stack and the first positive current collector is electrically coupled to each positive electrode of each cell of the second cell stack. A fourth example of the all-iron flow battery, optionally including one or more of the first through third examples of the all-iron flow battery, further comprises a second negative current collector arranged between the sub-stack separator plate and the second cell stack and a second positive current collector arranged between the second pressure plate and the second cell stack, wherein the second negative current collector is electrically coupled to each negative electrode of each cell of the second cell stack and the second positive current collector is electrically coupled to each positive electrode of each cell of the second cell stack. A fifth example of the all-iron flow battery, optionally including one or more of the first through fourth examples of the all-iron flow battery, further includes wherein the first pressure plate is coupled to the second pressure plate by a plurality of bolts extending through the first pressure plate, the first cell stack, the sub-stack separator plate, the second cell stack, and the second pressure plate, along the longitudinal axis. A sixth example of the all-iron flow battery, optionally including one or more of the first through fifth examples of the all-iron flow battery, further includes wherein the one or more compression assemblies include a first leaf spring extending across an outer surface of the first pressure plate and a second leaf spring extending across an outer surface of the second pressure plate and tie rods extending between the first leaf spring and the second leaf spring and wherein the first leaf spring and the second leaf spring is configured to exert pressure on the first pressure plate and the second pressure plate, respectively, by engaging ends of the tie rods with nuts and tightening the nuts.

In yet another example, the redox flow battery system comprises a first cell stack aligned with a second cell stack along a longitudinal axis of the redox flow battery system, the first cell stack separated from the second cell stack by a separator plate, a first pressure plate arranged at a terminal end of the first cell stack and a second pressure plate arranged at a terminal end of the second cell stack, and a compression assembly configured to exert pressure on the first pressure plate in a first direction and on the second pressure plate in a second, opposite direction to compress the first and second cell stacks along the longitudinal axis. A first example of the redox flow battery system further comprises nesting detents disposed in the first and second pressure plates configured to enable stacking of a first redox flow battery with a second redox flow battery along a direction perpendicular to the longitudinal axis. A second example of the redox flow battery system, optionally including the first example of the redox flow battery system, further includes wherein the nesting detents includes a first half of the nesting detents arranged in upper edges of both the first and second pressure plates and a second half of the nesting detents arranged in lower edges of both the first and second pressure plates and wherein the first half and the second half of the nesting detects includes apertures configured to receive a fastening device to maintain a stacked positioning of the first and second redox flow batteries.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A redox flow battery system, comprising:
    a set of pressure plates including a first pressure plate at a first terminal end of the redox flow battery system and a second pressure plate at a second terminal end of the redox flow battery system, the second terminal end opposite of the first terminal end along a longitudinal axis of the redox flow battery system;
    a sub-stack separator plate arranged between the first pressure plate and the second pressure plate and aligned with the set of pressure plates along the longitudinal axis;
    a first cell stack positioned between the first pressure plate and the sub-stack separator plate; and
    a second cell stack positioned between the second pressure plate and the sub-stack separator plate.

2. The redox flow battery system of claim 1, wherein the sub-stack separator plate electrically isolates the first cell stack from the second cell stack.

3. The redox flow battery system of claim 1, wherein the first cell stack and the second cell stack are compressed between the set of pressure plates by pressure exerted on the set of pressure plates by leaf springs.

4. The redox flow battery system of claim 1, wherein the set of pressure plates, the first cell stack, the sub-stack separator plate, and the second cell are maintained in place by a plurality of bolts extending along the longitudinal axis.

5. The redox flow battery system of claim 4, wherein the redox flow battery system is a self-supporting unit that does not include an external housing.

6. The redox flow battery system of claim 1, wherein each of the first cell stack and the second cell stack is formed from a plurality of cells and wherein each cell of the plurality of cells includes a negative electrode, a positive electrode, a bipolar plate, and a membrane separator.

7. The redox flow battery system of claim 6, wherein each cell of the plurality of cells in each of the first cell stack and the second cell stack is supported within a frame plate and each frame plate is aligned along the longitudinal axis and in contact with a frame plate adjacent to a face of the frame plate.

8. The redox flow battery system of claim 6, wherein each cell of the plurality of cells of the first cell stack is fluidly coupled to other cells of the plurality of cells within the first cell stack and each cell of the plurality of cells of the second cell stack is fluidly coupled to other cells of the plurality of cells within the second cell stack.

9. The redox flow battery system of claim 1, wherein a flow of an electrolyte between the first cell stack and the second cell stack is blocked by the sub-stack separator plate.

10. The redox flow battery system of claim 1, wherein an electrolyte flows between the first cell stack and the second cell stack via openings in the sub-stack separator plate.

11. An all-iron flow battery, comprising:
    a plurality of cells compressed between a first pressure plate and a second pressure plate, the plurality of cells formed of a first cell stack and a second cell stack, and wherein the first cell stack is separated from the second cell stack by a sub-stack separator plate positioned at a mid-point along a longitudinal axis of the all-iron flow battery and wherein the compression is provided by one or more compression assemblies.

12. The all-iron flow battery of claim 11, further comprising a set of inlet ports in the first pressure plate configured to flow electrolyte into the first cell stack, through the sub-stack separator plate, and into the second cell stack and a set of outlet ports in the first pressure plate configured to flow electrolyte out of the second cell stack, through the sub-stack separator plate, and out of the first cell stack and wherein the second pressure plate is a solid plate without ports.

13. The all-iron flow battery of claim 11, further comprising a first set of inlet ports and a first set of outlet ports in the first pressure plate configured to circulate electrolyte through the first cell stack, between the first pressure plate and the sub-stack separator plate and a second set of inlet ports and a second set of outlet ports in the second pressure plate configured to circulate electrolyte through the second cell stack, between the second pressure plate and the sub-stack separator plate.

14. The all-iron flow battery of claim 11, further comprising a first negative current collector arranged between the sub-stack separator plate and the first cell stack and a first positive current collector arranged between the first pressure plate and the first cell stack, wherein the first negative current collector is electrically coupled to each negative electrode of each cell of the first cell stack and the first positive current collector is electrically coupled to each positive electrode of each cell of the second cell stack.

15. The all-iron flow battery of claim 14, further comprising a second negative current collector arranged between the sub-stack separator plate and the second cell stack and a second positive current collector arranged between the second pressure plate and the second cell stack, wherein the second negative current collector is electrically coupled to each negative electrode of each cell of the second cell stack and the second positive current collector is electrically coupled to each positive electrode of each cell of the second cell stack.

16. The all-iron flow battery of claim 11, wherein the first pressure plate is coupled to the second pressure plate by a plurality of bolts extending through the first pressure plate, the first cell stack, the sub-stack separator plate, the second cell stack, and the second pressure plate, along the longitudinal axis.

17. The all-iron flow battery of claim 16, wherein the one or more compression assemblies include a first leaf spring extending across an outer surface of the first pressure plate and a second leaf spring extending across an outer surface of the second pressure plate and tie rods extending between the first leaf spring and the second leaf spring and wherein the first leaf spring and the second leaf spring is configured to exert pressure on the first pressure plate and the second pressure plate, respectively, by engaging ends of the tie rods with nuts and tightening the nuts.

18. A redox flow battery system, comprising:
    a first cell stack aligned with a second cell stack along a longitudinal axis of the redox flow battery system, the first cell stack separated from the second cell stack by a separator plate;
    a first pressure plate arranged at a terminal end of the first cell stack and a second pressure plate arranged at a terminal end of the second cell stack; and
    a compression assembly configured to exert pressure on the first pressure plate in a first direction and on the second pressure plate in a second, opposite direction to compress the first and second cell stacks along the longitudinal axis.

19. The redox flow battery system of claim 18, further comprising nesting detents disposed in the first and second pressure plates configured to enable stacking of a first redox flow battery with a second redox flow battery along a direction perpendicular to the longitudinal axis.

20. The redox flow battery system of claim 19, wherein the nesting detents includes a first half of the nesting detents arranged in upper edges of both the first and second pressure plates and a second half of the nesting detents arranged in lower edges of both the first and second pressure plates and wherein the first half and the second half of the nesting detects includes apertures configured to receive a fastening device to maintain a stacked positioning of the first and second redox flow batteries.

* * * * *